(12) United States Patent
Yu et al.

(10) Patent No.: US 9,811,894 B2
(45) Date of Patent: Nov. 7, 2017

(54) IMAGE PROCESSING METHOD AND APPARATUS

(71) Applicant: TENCENT TECHNOLOGY (SHENZHEN) COMPANY LIMITED, Shenzhen (CN)

(72) Inventors: Xiaoguang Yu, Shenzhen (CN); Shuguang Huang, Shenzhen (CN); Xiaowei Guo, Shenzhen (CN); Yang He, Shenzhen (CN); Chengzhao Zhang, Shenzhen (CN); Feiyue Huang, Shenzhen (CN); Zongqiao Yu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 32 days.

(21) Appl. No.: 15/155,833

(22) Filed: May 16, 2016

(65) Prior Publication Data

US 2016/0260204 A1 Sep. 8, 2016

Related U.S. Application Data

(63) Continuation of application No. PCT/CN2014/086528, filed on Sep. 15, 2014.

(30) Foreign Application Priority Data

Nov. 14, 2013 (CN) .......................... 2013 1 0573504

(51) Int. Cl.
*G06T 5/50* (2006.01)
*H04N 5/265* (2006.01)
*G06T 5/00* (2006.01)

(52) U.S. Cl.
CPC ................ *G06T 5/50* (2013.01); *G06T 5/005* (2013.01); *H04N 5/265* (2013.01); *G06T 2207/10016* (2013.01); *G06T 2207/30201* (2013.01)

(58) Field of Classification Search
CPC ............ G06T 5/50; G06T 5/005; H04N 5/265
See application file for complete search history.

(56) References Cited

U.S. PATENT DOCUMENTS 6,463,205 B1 * 10/2002 Aschbrenner ....... G07F 17/0042
   348/E5.051
6,806,898 B1 * 10/2004 Toyama .................. G06T 5/006
   348/14.01

(Continued)

FOREIGN PATENT DOCUMENTS

CN    1920880 A    2/2007
CN    101098241 A    1/2008

(Continued)

OTHER PUBLICATIONS

The World Intellectual Property Organization (WIPO) International Search Report for PCT/CN2014/086528 dated Dec. 15, 2014.

(Continued)

*Primary Examiner* — David F Dunphy
(74) *Attorney, Agent, or Firm* — Anova Law Group, PLLC

(57) ABSTRACT

An image processing method is provided. The method includes obtaining a human facial image and providing a total of n number of source images in a preconfigured file, where n is an integer greater than 2, and each source image corresponds to adjusting parameters for the source image in the preconfigured file. The method also includes generating a synthesized human facial image for the each source image by adjusting the human facial image based on the adjusting parameters corresponding to the source image in the pre- (Continued)

configured file, individually synthesizing the each source image and the synthesized human facial image for the each source image to obtain n number frames of synthesized images, and combining the n number frames of synthesized images into a dynamic image in a time order.

15 Claims, 6 Drawing Sheets

(56) References Cited

U.S. PATENT DOCUMENTS

| | | | | |
|---|---|---|---|---|
| 9,013,489 | B2* | 4/2015 | Evertt | G06T 19/20 345/418 |
| 9,314,692 | B2* | 4/2016 | Konoplev | A63F 13/55 |
| 2007/0008322 | A1* | 1/2007 | Ludwigsen | G06T 15/02 345/473 |
| 2009/0132371 | A1* | 5/2009 | Strietzel | G06Q 30/02 705/14.46 |
| 2010/0007665 | A1* | 1/2010 | Smith | G06T 13/40 345/473 |
| 2011/0115798 | A1* | 5/2011 | Nayar | G06T 13/40 345/473 |
| 2014/0022249 | A1* | 1/2014 | Ye | G06T 13/40 345/420 |

FOREIGN PATENT DOCUMENTS

| | | |
|---|---|---|
| CN | 101179665 A | 5/2008 |
| CN | 101945216 A | 1/2011 |
| CN | 102497530 A | 6/2012 |
| CN | 102866871 A | 1/2013 |
| CN | 103136771 A1 | 6/2013 |
| JP | 2008059005 A | 3/2008 |
| KR | 20050094217 A | 9/2005 |

OTHER PUBLICATIONS

The State Intellectual Property Office of the People's Republic of China (SIPO) Office Action 1 for 201310573504.8 dated Apr. 18, 2017 pp. 1-10.

The State Intellectual Property Office of the People's Republic of China (SIPO) Office Action 2 for 2013105735048 Jun. 14, 2017 pp. 1-10.

* cited by examiner

IMAGE PROCESSING METHOD AND APPARATUS

CROSS-REFERENCES TO RELATED APPLICATIONS

This application is a continuation of PCT Application No. PCT/CN2014/086528, filed on Sep. 15, 2014, which claims priority to Chinese Patent Application No. 201310573504.8, filed on Nov. 14, 2013. The entire content of the two applications is incorporated herein by reference.

FIELD OF THE DISCLOSURE

The present disclosure generally relates to the field of imaging processing and, more particularly, relates to imaging processing methods and apparatuses.

BACKGROUND

Currently, some common practices to process human images include superimposing some images on top of a human facial image, or beautifying a human facial image etc. For example, after a user captures a human facial picture through a camera apparatus, the human facial image may be modified according to personal preferences or some features of the human facial image. However, the human facial images generated by such methods are static, and a static human facial image may only show a single human facial expression, not a plurality of human facial expressions.

The disclosed methods and apparatuses are directed to solve one or more problems set forth above and other problems.

BRIEF SUMMARY OF THE DISCLOSURE

One aspect of the present disclosure includes an image processing method. The method includes obtaining a human facial image and providing a total of n number of source images in a preconfigured file, where n is an integer greater than 2, and each source image corresponds to adjusting parameters for the source image in the preconfigured file. The method also includes generating a synthesized human facial image for the each source image by adjusting the human facial image based on the adjusting parameters corresponding to the source image in the preconfigured file, individually synthesizing the each source image and the synthesized human facial image for the each source image to obtain n number frames of synthesized images, and combining the n number frames of synthesized images into a dynamic image in a time order.

Another aspect of the present disclosure includes an image processing apparatus. The image processing apparatus includes an obtaining unit, a synthesizing unit, and a combining unit. The obtaining unit is configured to obtain a human facial image. The synthesizing unit is configured to provide a total of n number of source images in a preconfigured file, where n is an integer greater than 2 and each source image corresponds to adjusting parameters for the source image in the preconfigured file. The synthesizing unit is also configured to generate a synthesized human facial image for the each source image by adjusting the human facial image based on the adjusting parameters corresponding to the source image in the preconfigured file, and to individually synthesize the each source image and the synthesized human facial image for the each source image to obtain n number frames of synthesized images. The combining unit is configured to combine the n number frames of synthesized images into a dynamic image in a time order.

Other aspects or embodiments of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-6 depict exemplary imaging processing methods and apparatuses in accordance with various disclosed embodiments. The exemplary methods and apparatus may be implemented, for example, in an exemplary environment 800 as shown in FIG. 8.

Figure 8:
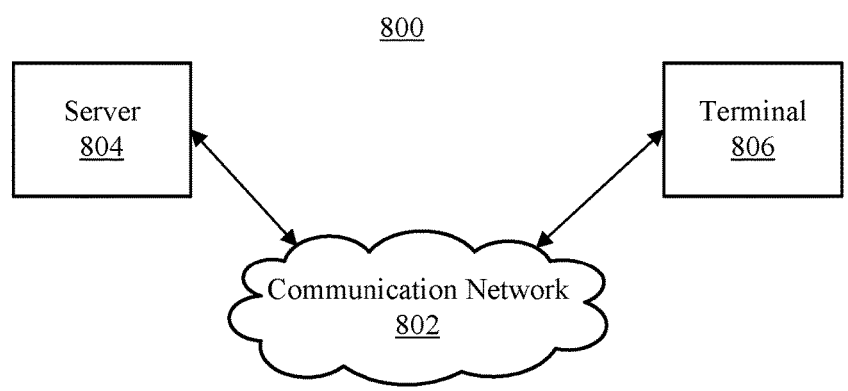
FIG. 8 depicts an exemplary environment incorporating certain disclosed embodiments.

As shown in FIG. 8, the environment 800 may include a server 804, a terminal 806, and a communication network 802. The server 804 and the terminal 806 may be coupled through the communication network 802 for information exchange, for example, Internet searching, webpage browsing, etc. Although only one terminal 806 and one server 804 are shown in the environment 800, any number of terminals 806 or servers 804 may be included, and other devices may also be included.

The communication network 802 may include any appropriate type of communication network for providing network connections to the server 804 and terminal 806 or among multiple servers 804 or terminals 806. For example, the communication network 802 may include the Internet or other types of computer networks or telecommunication networks, either wired or wireless.

A terminal, as used herein, may refer to any appropriate user terminal device with certain computing capabilities including, for example, a personal computer (PC), a work station computer, a notebook computer, a car-carrying computer (e.g., carried in a car or other vehicles), a server computer, a hand-held computing device (e.g., a tablet computer), a mobile terminal (e.g., a mobile phone, a smart phone, an iPad, and/or an aPad), a POS (i.e., point of sale)

device, or any other user-side computing device. In various embodiments, the terms "terminal" and "terminal device" may be used interchangeably. In various embodiments, the terminal 806 may include an apparatus such as an image processing apparatus.

A server, as used herein, may refer one or more server computers configured to provide certain server functionalities including, for example, search engines and database management. A server may also include one or more processors to execute computer programs in parallel.

Figure 7:
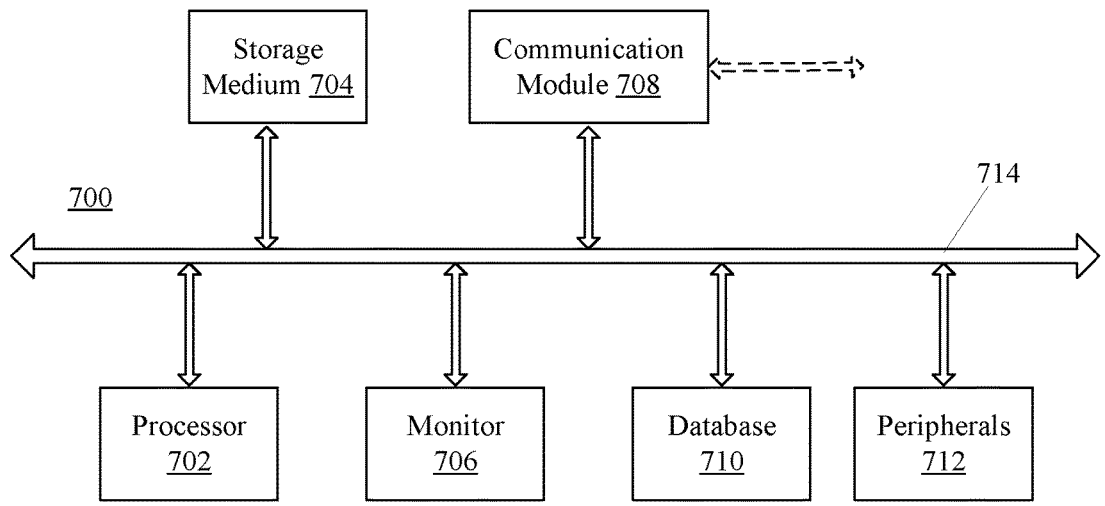
FIG. 7 depicts an exemplary computer system consistent with the disclosed embodiments.

The server 804 and/or the terminal 806 may be implemented on any appropriate computing platform. FIG. 7 shows a block diagram of an exemplary computing system 700 capable of implementing the server 804 and/or the terminal 806. As shown in FIG. 7, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 may include any appropriate processor or processors. Further, the processor 702 may include multiple cores for multi-thread or parallel processing. The storage medium 704 may include memory modules, for example, ROM, RAM, and flash memory modules, and mass storages, for example, CD-ROM, U-disk, removable hard disk, etc. The storage medium 704 may store computer programs for implementing various processes, when executed by the processor 702.

Further, the peripherals 712 may include I/O devices, for example, keyboard and mouse, and the communication module 708 may include network devices for establishing connections through the communication network 802. The database 710 may include one or more databases for storing certain data and for performing certain operations on the stored data, for example, webpage browsing, database searching, etc.

In operation, the terminal 806 may cause the server 804 to perform certain actions, for example, an Internet search or other database operations. The server 804 may be configured to provide structures and functions for such actions and operations. More particularly, the server 804 may store target images used for image processing methods and apparatuses. In various embodiments, the terminal 806 may include a terminal, for example, a mobile terminal involved in the disclosed methods and apparatuses.

Figure 1:
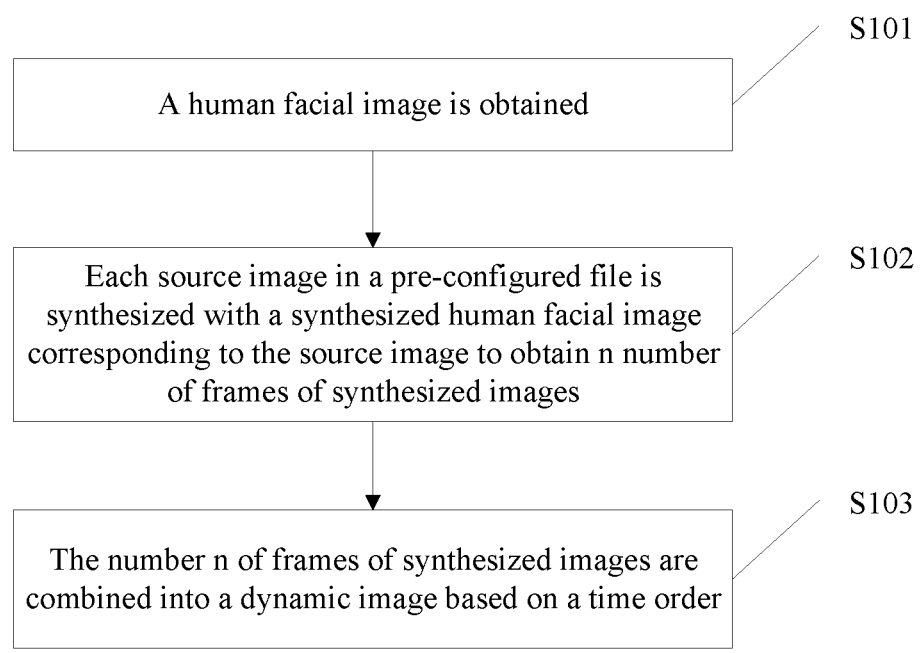
FIG. 1 depicts an exemplary imaging processing method consistent with various disclosed embodiments.

FIG. 1 depicts an exemplary imaging processing method consistent with various disclosed embodiments. As shown in FIG. 1, the method may include the following steps.

In Step S101, a human facial image is obtained. The human facial image may be an image including a human facial contour. The human facial image may also be a human facial image extracted from a portrait containing a human facial image(s), or may be a human facial image captured directly.

In Step 102, each source image in a pre-configured file is synthesized with a synthesized human facial image corresponding to the source image. A total n number of frames of synthesized images are obtained. That is, the preconfigured file includes n number of preconfigured source images. The synthesized human facial image corresponding to the source image is the human facial image after the human facial image is adjusted based on adjusting parameters. The adjusting parameters are adjusting parameters corresponding to the configuration of the source images in the file. The number n is an integer greater than 2.

Further, the pre-configured file may contain n number of source images, and each source image is configured with corresponding adjusting parameters. After the human facial image is obtained in Step S101, the human facial image may be adjusted based on the adjusting parameters corresponding to each source image to obtain the synthesized human facial image corresponding to the source image. The adjusting parameters may include at least one of the following parameters: positional coordinates of the human facial image in the source image, a zooming ratio of the human facial image, a rotating angle and facial deformation parameters of the human facial image.

Further, it should be noted, the adjusting parameters of each source image may be different, or may be the same. For example, in a file containing 5 source images, the adjusting parameters of 2 of the source images may be the same, while the adjusting parameters of the other 3 source images are different.

The synthesized human facial image may be the human facial image being processed according to at least one of the following processing on the above human facial image: shifting position of the human facial image abased on the positional coordinates, zooming the human facial image based on the zooming ratio, rotating the human facial image based on the rotating angle, and changing facial features of the human facial image based on the deformation parameters.

Further, the facial deformation parameters may be parameters that transform at least one of the human facial features, such as a mouth, eye(s), a nose, years, and eyebrows. For example, the parameters may be the parameters used to change a mouth into an open shape, or the parameters used to change an eye(s) into a closed shape, etc.

Further, the human facial image may include a single human face, or may include a plurality of human faces. When the human facial image includes a plurality of human faces, the adjusting parameters may also include human face adjusting parameters. The human face adjusting parameters may be used to add human face(s) onto the human facial image, or to remove human face(s) from the human facial image, or to move the position of each human face(s) on the human facial image. Thus, the human face adjusting parameters may be used to achieve interaction among a plurality of human faces to enhance the interactive effect of human faces of dynamic images.

Further, the source image may include a foreground image and a background image. Thus, through Step S102, the foreground image of the source image, the background image of the source image, and the corresponding synthesized human facial image may be synthesized into one frame of synthesized image, i.e., the three images are synthesized into one image. Because the synthesized image is derived from the foreground image, the background image and the synthesized human facial image, the synthesized image may display an image with distinctive layers and improved visual effects.

In Step 103, the n number frames of synthesized images are combined into a dynamic image in a time order. For example, after the n number frames of synthesized images are obtained, in Step S103, the n number frames of synthesized images are combined in a time order. For example, the time order may be the time order to play each synthesized image.

The above method may be applied to any specific image processing apparatus, such as tablet computers, mobile phones, e-readers, remote controls, personal computers (PCs), Notebook computers, automotive equipment, network televisions, wearable devices and other smart devices with networking capabilities.

Thus, according to the disclosed embodiments, a human facial image is obtained. Individual pre-configured source images in a file are synthesized with a synthesized human facial image corresponding to the source images to obtain a total n number of frames of synthesized images. The file includes the n number of source images, and the synthesized human facial image corresponding to the source images is the human facial image adjusted based on adjusting parameters. The adjusting parameters are adjusting parameters corresponding to the configuration of the source images in the file. The number n is an integer greater than 2. The n number frames of synthesized images are combined into a dynamic image based on a time order. Thus, the human facial image may be synthesized into a dynamic image (or an image sequence) composed with a plurality of synthesized images, so as to achieve the display of a plurality of expressions of a human face(s).

Figure 2:
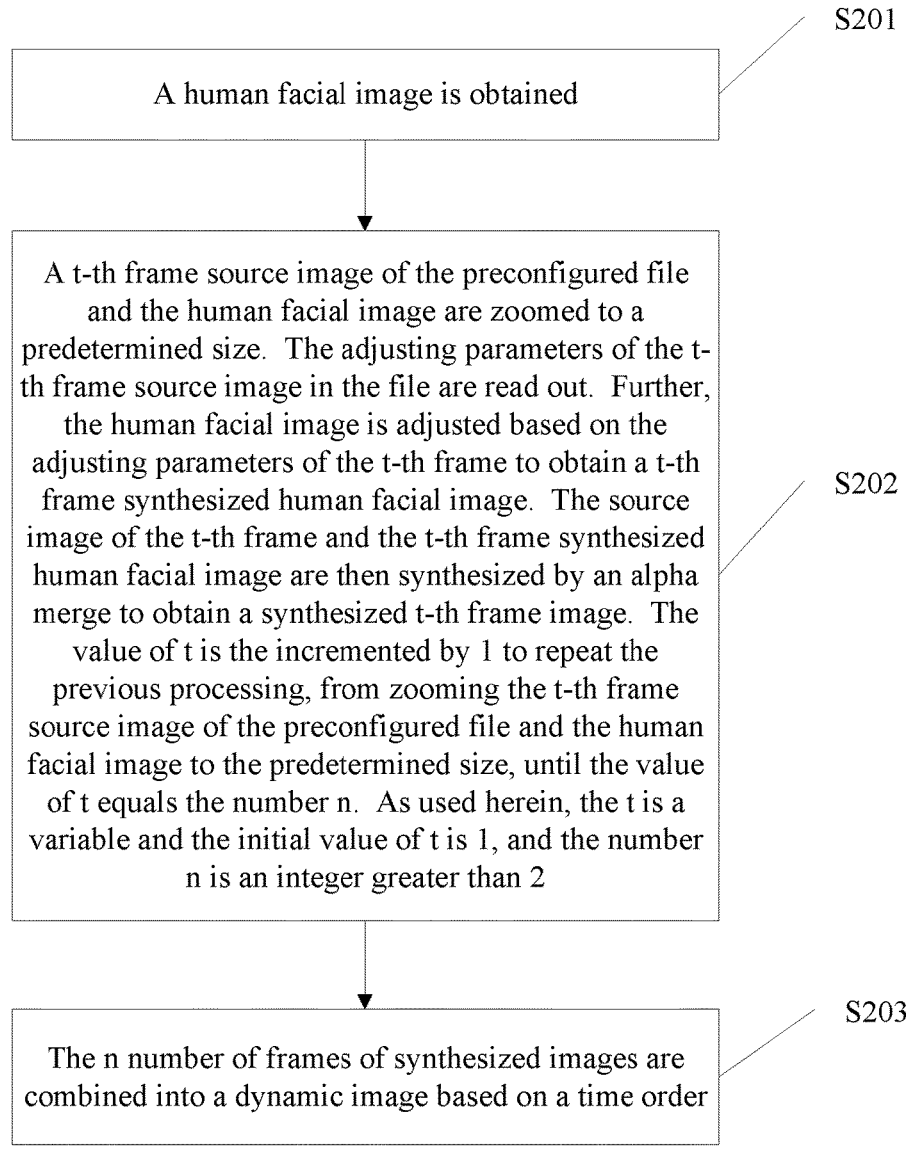
FIG. 2 depicts another exemplary imaging processing method consistent with various disclosed embodiments.

FIG. 2 depicts another exemplary imaging processing method consistent with various disclosed embodiments. As shown in FIG. 2, the method may include the following steps.

In Step S201, a human facial image is obtained. Specifically, in Step S201, a target image including the human facial image is obtained. The target image is aligned with a preset mask, and the human facial image is extracted from the target image based on the mask.

The target image may be the target image obtained locally, or may be the target image obtained through the Internet. For example, the target image may be obtained from locally pre-stored images, or from a server or other terminals through the Internet. The mask may be an image including a human facial area, and the human facial area may be transparent or semi-transparent.

The alignment of the target image with the preset mask may be performed by aligning of the human facial area of the target image with the human facial area of the mask. Specifically, the alignment may be performed by aligning the center point between two eyes of the human facial image in the target image with the reference center point between two eyes in the mask, and aligning the mouth of the human facial image in the target image with the reference point of the mouth position in the mask. Further, extracting the human facial image from the target image based on the mask may be performed by automatically or manually extracting the human facial image. Because the mask is preset, i.e., the position coordinates of the human facial area on the bask may be predetermined, the human facial image may be extracted using the position coordinates, i.e., the image with the position coordinates of the extracted human facial area becomes the human facial image.

Further, in Step S201, an image of a human face is captured through a camera device with an interface displaying the mask to create a human facial image located within the human facial area of the mask, and the human facial image is then extracted from the captured image.

That is, when Step S201 is performed, the current interface of the camera device displays the mask. Thus, the image captured by the camera device uses the mask as the background image. Because the mask includes a transparent or semi-transparent human facial area, the image captured by the camera device is a captured imaged with the human facial image located within the human facial area of the mask. The human facial image can then be extracted from the captured image automatically or manually.

In Step S202, a t-th frame source image of the preconfigured file and the human facial image are zoomed to a predetermined size. The adjusting parameters of the t-th frame source image in the file are read out. Further, the human facial image is adjusted based on the adjusting parameters of the t-th frame to obtain a t-th frame synthesized human facial image. The source image of the t-th frame and the t-th frame synthesized human facial image are then synthesized by an alpha merge to obtain a synthesized t-th frame image. The value of t is the incremented by 1 to repeat the previous processing, from zooming the t-th frame source image of the preconfigured file and the human facial image to the predetermined size, until the value of t equals the number n. As used herein, the t is a variable and the initial value of t is 1, and the number n is an integer greater than 2.

For example, in Step S202, the source image of a first frame and the human facial image are zoomed to the predetermined size. Adjusting parameters of the first frame in the file are read out, and the human facial image is adjusted based on the adjusting parameters of the first frame to obtain the first frame synthesized human facial image. The first frame source image of and the first frame synthesized human facial image are synthesized by an alpha merge to obtain the first frame synthesized image. And then the synthesized image of the second frame may be obtained similarly to the first frame synthesized image, until the synthesized image of the n-th frame is obtained.

Further, the predetermined size may be a size or resolution determined in advance. In addition, the alpha channel information of each source image may also be predetermined, e.g., the alpha channel information is configured for the source image when the source image was generated. The alpha channel information of each synthesized human facial image may include alpha channel information pre-configured for the synthesized human facial image in the file. The alpha channel information of each synthesized human facial image may also be alpha channel information obtained at the time of the generation of the human facial image, e.g., the alpha channel information of human facial image obtained from the mask and used in each synthesized human facial image.

Further, the adjusting parameters of the t-th frame include at least one of the following parameters: positional coordinates of the human facial image in the source image, a zooming ratio of the human facial image, a rotating angle of the human facial image, and facial deformation parameters, etc.

The adjusting of the human facial image based on the adjusting parameters of the t-th frame to obtain the synthesized human facial image of the t-th frame includes the adjusting the human facial image based on the adjusting parameters of the t-th frame to obtain the synthesized human facial image of the t-th frame. The image adjusting includes at least one of: shifting position of the human facial image abased on the positional coordinates, zooming the human facial image based on the zooming ratio, rotating the human facial image based on the rotating angle, and changing facial features of the human facial image based on the deformation parameters.

For example, the adjusting parameters of the t-th frame include: positional coordinates of the human facial image in the source image, a zooming ratio of the human facial image, a rotating angle and facial deformation parameters of the human facial image. The adjusting the human facial image based on the adjusting parameters of the t-th frame to obtain the synthesized human facial image of the t-th frame includes: first zooming and rotating he human facial image based on the zooming ratio and the rotating angle, and then moving the processed human facial image to the position of the positional coordinates to obtain the synthesized human facial image of the t-th frame. Further, the facial deformation parameters may be parameters that transform at least one of the human facial features, such as a mouth, eye(s), a nose, years, and eyebrows. For example, the parameters may be the parameters used to change a mouth into an open shape, or the parameters used to change an eye(s) into a closed shape, etc.

Further, the human facial image may include a single human face, or may include a plurality of human faces. When the human facial image includes a plurality of human faces, the adjusting parameters may also include human face adjusting parameters. The human face adjusting parameters may be used to add human face(s) onto the human facial image, or to remove human face(s) from the human facial image, or to move the position of each human face(s) on the human facial image. Thus, the human face adjusting parameters may be used to achieve interaction among a plurality of human faces to enhance the interactive effect of human faces of dynamic images.

In Step S203, the n number frames of synthesized images are combined into a dynamic image based on a time order. For example, in Step S203, true colors of each synthesized image of the n number frames of synthesized images are quantified into preset specified 256 colors. A time delay is set for each synthesized image based on configuration parameters of the time delay contained in the file. The n number frames of synthesized images are combined into the dynamic image based on the time delay of each synthesized image.

It should be noted that the 256 colors may refer to 256 colors defined by Graphics Interchange Format (GIF) file. The 256 colors are well known colors in the field of image process. Further, the file may include pre-configured time delay parameters for each synthesized image. For example, the time delay of the synthesized image of the first frame may be 0-500 millisecond (ms) during the playback of the dynamic image. The time delay of the synthesized image of the second frame may be 500-800 ms during the playback of the dynamic image. The time delay of the synthesized image of the third frame may be 800-1200 ms during the playback of the dynamic image. Thus, in Step S203, each synthesized image may be combined into a dynamic image. In addition, in Step S203, true colors of each synthesized image of the n number frames of synthesized images may be quantified into preset specified 256 colors. The time delay of each synthesized image may be set based on configuration parameters contained in the file, and be written into specified file based on each synthesized image. The dynamic image generated by the file may be displayed.

Further, after Step S201 and before Step S202, the method may further include beautifying the human facial image, specifically, the beautifying the color and the feature/pattern of human facial image, so as to improve the visual effect of human facial image.

Further, the dynamic image may be dynamic expression shared among communication accounts. The file may be one of the different files contained in a pre-configured source expression package. Thus, in one embodiment, the method may be performed repeatedly. Of course, the file used at each time may be a different file in the source expression package, such that a plurality of dynamic expression may be generated.

The above method may be applied to any specific image processing apparatus, such as tablet computers, mobile phones, e-readers, remote controls, personal computers (PCs), Notebook computers, automotive equipment, network televisions, wearable devices and other smart devices with networking capabilities.

Figure 3:
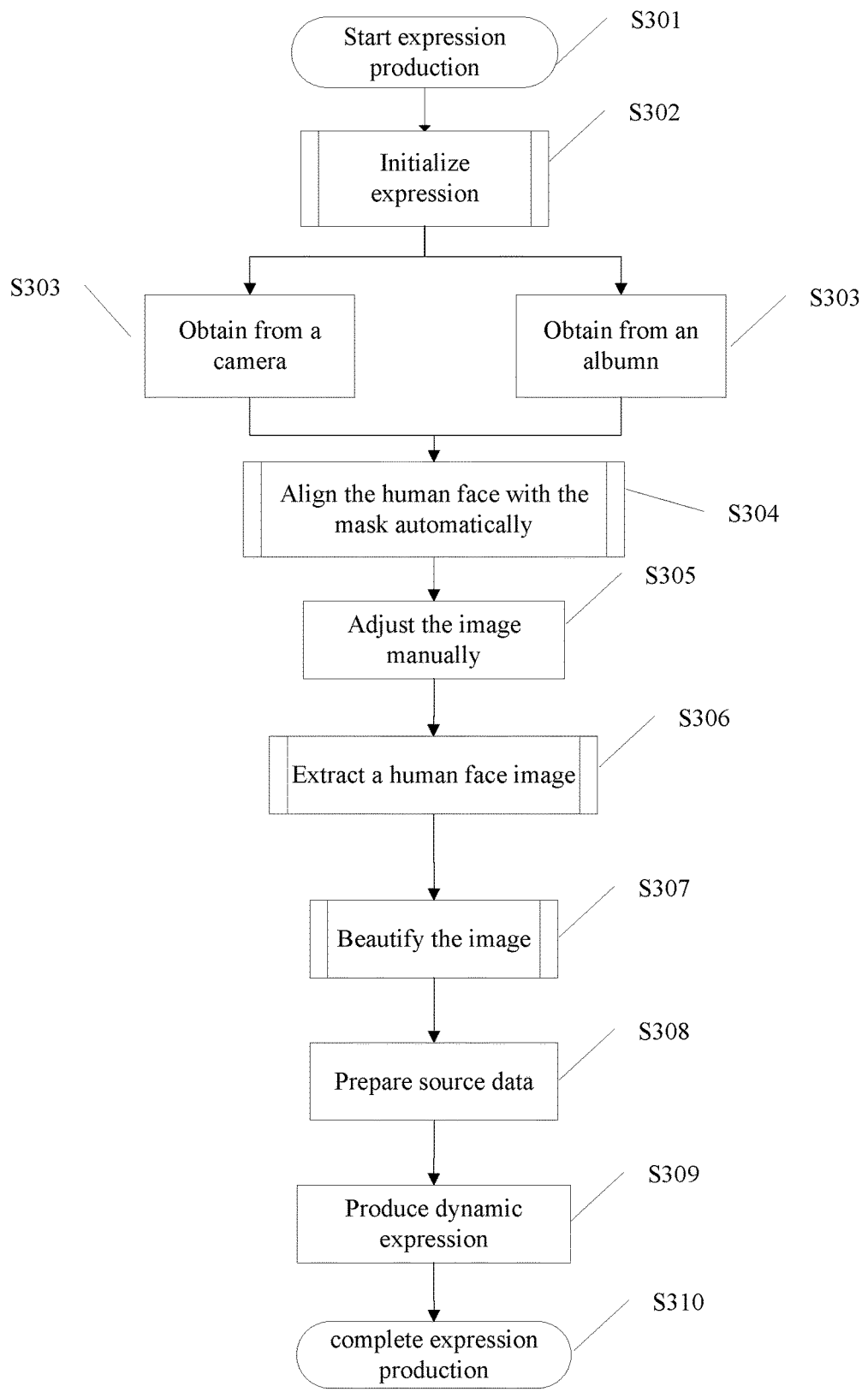
FIG. 3 depicts an exemplary flowchart of the processing method consistent with various disclosed embodiments.

FIG. 3 depicts an exemplary flowchart of the processing method consistent with various disclosed embodiments. As shown in FIG. 3, the processing method may include the following steps.

Step S301, starting expression creation process.

Step S302, initializing expression.

Step S303, obtaining an image including a human face by a camera or by selecting from an album.

Step S304, automatically aligning the human face with the mask.

Step S305, manually adjusting the image, i.e., receiving inputs from the user to adjust the image manually, such that the image is adjusted to the desired position according to the user, where the desired position may be the desired position of the image relative to the mask.

Step S306, extracting a human face image, e.g., extracting the human face image through the mask.

Step S307, beautifying the image, e.g., beautifying the extracted human facial image.

Step S308, preparing source or background data, e.g., obtaining a source image(s) and corresponding adjusting parameters from a pre-configured file.

S309, creating dynamic expressions, e.g., the synthesis of the source images with the synthesized human facial image and the combining of the n number frames of synthesized images into a dynamic image.

Step S310, completing the expression creation.

Figure 4:
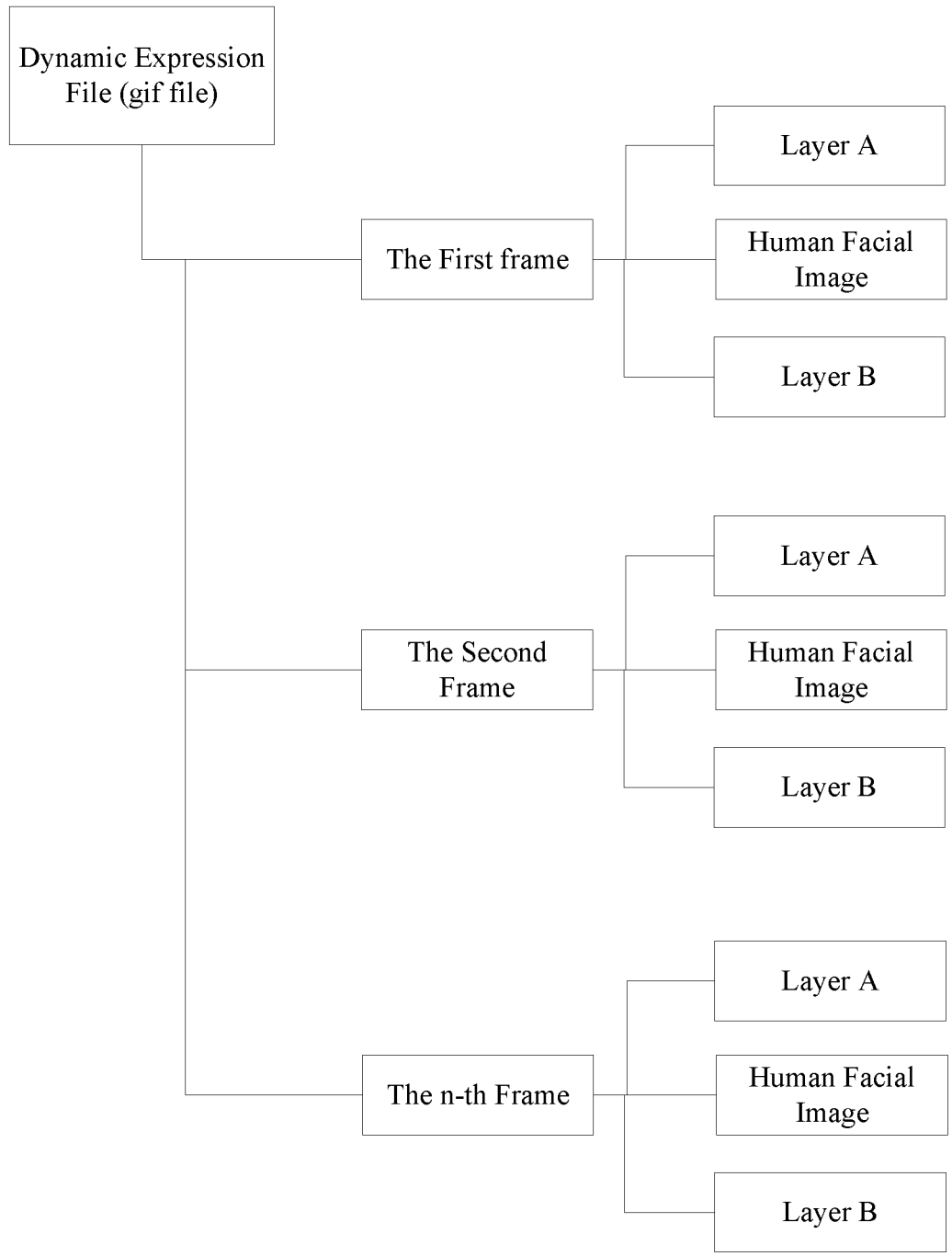
FIG. 4 depicts an exemplary format of the file generated in the imaging processing method consistent with various disclosed embodiments.

FIG. 4 depicts an exemplary format of the file generated in the imaging processing method consistent with various disclosed embodiments. As shown in FIG. 4, the dynamic expression file may include the first frame, the second frame, . . . , the n-th frame. Each frame may include a layer A, a human facial image, a layer B. The layer A may be a foreground image, and the layer B may be a background image.

Figure 5:
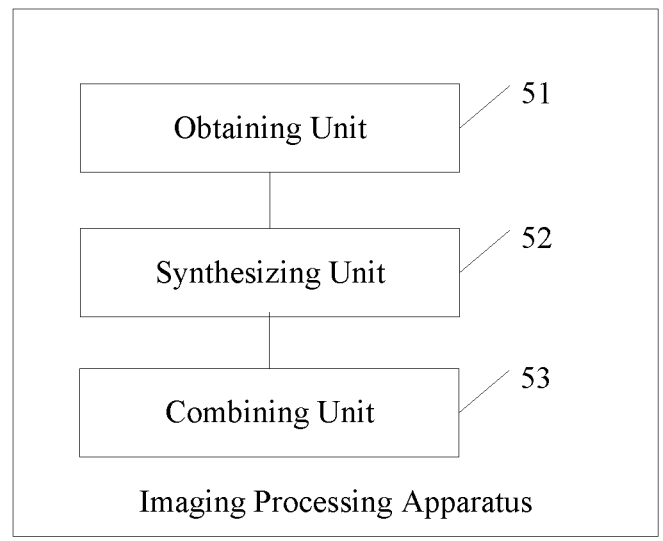
FIG. 5 depicts an exemplary imaging processing apparatus consistent with various disclosed embodiments.
Figure 6:
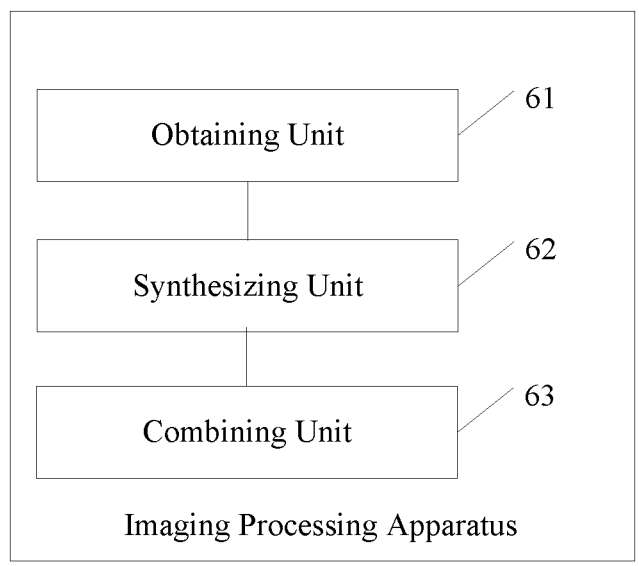
FIG. 6 depicts another exemplary imaging processing apparatus consistent with various disclosed embodiments.

Certain embodiments for imaging processing apparatuses are described below, which may be configured to perform above imaging processing methods. For illustrative purposes, only certain related parts are shown in FIG. 5 and FIG. 6. Other technical details may be referred to the descriptions in FIG. 1 and FIG. 2.

FIG. 5 depicts an exemplary imaging processing apparatus consistent with various disclosed embodiments. As shown in FIG. 5, the imaging processing apparatus may include an obtaining unit 51, a synthesizing unit 52, and a combining unit 53.

The obtaining unit 51 is configured to obtain a human facial image. Further, the human facial image may be an image including a human facial contour. Additionally, the human facial image obtained by obtaining unit 51 may be a human facial image extracted from a portrait containing a human facial image(s), or may be a human facial image captured directly.

The synthesizing unit 52 is configured to synthesize each pre-configured source image in a file with a synthesized human facial image corresponding to the source image, and to obtain n number frames of synthesized images. The file includes the n number of source images. The synthesized human facial image corresponding to the source image is the human facial image after adjusting the human facial image based on adjusting parameters. The adjusting parameters are adjusting parameters corresponding to the configuration of the source image in the file. The number n is an integer greater than 2.

Further, the pre-configured file may contain n number of source image. And each source image is configured with corresponding adjusting parameters. After the obtaining unit 51 obtains the human facial image, the synthesizing unit 52 adjusts the human facial image based on the adjusting parameters corresponding to each source image to obtain the synthesized human facial image corresponding to the source image. The adjusting parameters may include at least one of the following parameters: positional coordinates of the human facial image in the source image, a zooming ratio of the human facial image, a rotating angle of the human facial image, and facial deformation parameters.

Further, it should be noted, the adjusting parameters of each source image may be different, or may be the same. For example, in a file containing 5 source images, the adjusting parameters of 2 of the source images may be the same, but the adjusting parameters of the other 3 source images may be different.

The synthesized human facial image may be the human facial image being processed according to at least one of the following processing on the above human facial image: shifting position of the human facial image abased on the positional coordinates, zooming the human facial image based on the zooming ratio, rotating the human facial image based on the rotating angle, and changing facial features of the human facial image based on the deformation parameters.

Further, the facial deformation parameters may be parameters that transform at least one of the human facial features, such as a mouth, eye(s), a nose, years, and eyebrows. For example, the parameters may be the parameters used to change a mouth into an open shape, or the parameters used to change an eye(s) into a closed shape, etc.

Further, the human facial image may include a single human face, or may include a plurality of human faces. When the human facial image includes a plurality of human faces, the adjusting parameters may also include human face adjusting parameters. The human face adjusting parameters may be used to add human face(s) onto the human facial image, or to remove human face(s) from the human facial image, or to move the position of each human face(s) on the human facial image. Thus, the human face adjusting parameters may be used to achieve interaction among a plurality of human faces to enhance the interactive effect of human faces of dynamic images.

Further, the source image may include a foreground image and a background image. Thus, through synthesizing unit 52, the foreground image of the source image, the background image of the source image, and the corresponding synthesized human facial image may be synthesized into one frame of synthesized image, i.e., the three images are synthesized into one image. Because the synthesized image is derived from the foreground image, the background image, and the synthesized human facial image, the synthesized image may display an image with distinctive layers and improved visual effects.

The combining unit 53 is configured to combine the n number frames of synthesized images into a dynamic image based on a time order. Further, after the synthesizing unit 52 obtains the n number frames of synthesized images, the combining unit 53 combines the n number frames of synthesized images based on a time order. For example, the time order may be the time order to play each synthesized image.

The above apparatus may be applied to any specific image processing apparatus, such as tablet computers, mobile phones, e-readers, remote controls, personal computers (PCs), Notebook computers, automotive equipment, network televisions, wearable devices and other smart devices with networking capabilities.

Thus, according to the disclosed embodiments, a human facial image is obtained. Each pre-configured source image in a file is synthesized with a synthesized human facial image corresponding to the source image. A total of n number frames of synthesized images are obtained. The file includes the number n of source images. The synthesized human facial image corresponding to the source image is the human facial image performed with an image adjusting treatment on the human facial image based on adjusting parameters. The adjusting parameters are adjusting parameters corresponding to the configuration of the source image in the file. The number n is an integer greater than 2. The n number frames of synthesized images are combined into a dynamic image based on a time order. Thus, the human facial image may be synthesized into a dynamic image composed with a plurality of synthesized images, so as to achieve the display of a plurality of expressions of a human face(s).

FIG. 6 depicts another exemplary imaging processing apparatus consistent with various disclosed embodiments. As shown in FIG. 6, the imaging processing apparatus may include an obtaining unit 51, a synthesizing unit 52, and a combining unit 53.

The obtaining unit 61 is configured to obtain a human facial image. Further, the obtaining unit 61 may be configured to obtain a target image including the human facial image, to align the target image with a preset mask, and then to extract the human facial image from the target image based on the mask.

Specifically, the target image may be the target image obtained locally, or may be the target image obtained through Internet. For example, the target image is obtained from local pre-stored images, or be obtained from a server or other terminals through Internet. In addition, the mask may be an image including human facial area, and the human facial area may be transparent or semi-transparent. The alignment of the target image with the preset mask may be obtained by aligning the human facial area of the target image with the human facial area of the mask. Specifically, the alignment may be obtained by aligning the point of the center position of two eyes of the human facial image in the target image with the reference point indicating the center position of two eyes in the mask, and aligning the mouth of the human facial image in the target image with the reference point of the mouth position in the mask. Specifically, the human facial image extracted from the target image based on the mask may be the human facial image extracted automatically or manually. Because the mask is preset, i.e., the position coordinates of the human facial area in the bask may be predetermined, the human facial image may be extracted based on the position coordinates, i.e., the image extracted from the position coordinates of the human facial area may become the human facial image.

The obtaining unit 61 may be configured to capture an image of a human face through a camera device with an interface displaying the mask to create a human facial image located within the human facial area of the mask, and the human facial image is then extracted from the captured image.

When the obtaining unit 61 is performing the image capture, the current interface of the camera device displays the mask. Thus, the image captured by the camera device uses the mask as the background image. Because the mask includes a transparent or semi-transparent human facial area, the image captured by the camera device is a captured imaged with the human facial image located within the human facial area of the mask. The human facial image can then be extracted from the captured image automatically or manually.

The synthesizing unit 62 is configured to zoom a t-th frame source image of the preconfigured file and the human facial image to a predetermined size. The adjusting parameters of the t-th frame source image in the file are read out. Further, the human facial image is adjusted based on the adjusting parameters of the t-th frame to obtain a t-th frame synthesized human facial image. The source image of the t-th frame and the t-th frame synthesized human facial image are then synthesized by an alpha merge to obtain a synthesized t-th frame image. The value of t is the incremented by 1 to repeat the previous processing, from zooming the t-th frame source image of the preconfigured file and the human facial image to the predetermined size, until the value of t equals the number n. As used herein, the t is a variable and the initial value of t is 1, and the number n is an integer greater than 2

For example, the synthesizing unit 62 may be configured to zoom the source image of a first frame and the human facial image to a default size. Adjusting parameters of the first frame in the file are read. The human facial image is adjusted based on the adjusting parameters of the first frame to obtain the synthesized human facial image of the first frame. An alpha merge of the source image of the first frame is performed with the synthesized human facial image of the first frame to obtain the synthesized image of the first frame. And then the synthesizing unit 62 may merge the synthesized image of the second frame by the method used to merge the synthesized image of the first frame, until the synthesized image of the n-th frame is obtained.

For example, the synthesizing unit 62 may be configured to zoom the source image of a first frame and the human facial image to the predetermined size. Adjusting parameters of the first frame in the file are read out, and the human facial image is adjusted based on the adjusting parameters of the first frame to obtain the first frame synthesized human facial image. The synthesizing unit 62 may synthesize the first frame source image of and the first frame synthesized human facial image by an alpha merge to obtain the first frame synthesized image. And then the synthesized image of the second frame may be obtained similarly to the first frame synthesized image, until the synthesized image of the n-th frame is obtained.

Further, the predetermined size may be a size or resolution determined in advance. In addition, the alpha channel information of each source image may also be predetermined, e.g., the alpha channel information is configured for the source image when the source image was generated. The alpha channel information of each synthesized human facial image may include alpha channel information pre-configured for the synthesized human facial image in the file. The alpha channel information of each synthesized human facial image may also be alpha channel information obtained at the time of the generation of the human facial image, e.g., the alpha channel information of human facial image obtained from the mask and used in each synthesized human facial image.

Further, the adjusting parameters of the t-th frame include at least one of the following parameters: positional coordinates of the human facial image in the source image, a zooming ratio of the human facial image, a rotating angle of the human facial image, and facial deformation parameters, etc.

The adjusting of the human facial image based on the adjusting parameters of the t-th frame to obtain the synthesized human facial image of the t-th frame includes the adjusting the human facial image based on the adjusting parameters of the t-th frame to obtain the synthesized human facial image of the t-th frame. The image adjusting includes at least one of: shifting position of the human facial image abased on the positional coordinates, zooming the human facial image based on the zooming ratio, rotating the human facial image based on the rotating angle, and changing facial features of the human facial image based on the deformation parameters.

For example, the adjusting parameters of the t-th frame include: positional coordinates of the human facial image in the source image, a zooming ratio of the human facial image, a rotating angle and facial deformation parameters of the human facial image. The adjusting the human facial image based on the adjusting parameters of the t-th frame to obtain the synthesized human facial image of the t-th frame includes: first zooming and rotating he human facial image based on the zooming ratio and the rotating angle, and then moving the processed human facial image to the position of the positional coordinates to obtain the synthesized human facial image of the t-th frame. Further, the facial deformation parameters may be parameters that transform at least one of the human facial features, such as a mouth, eye(s), a nose, years, and eyebrows. For example, the parameters may be the parameters used to change a mouth into an open shape, or the parameters used to change an eye(s) into a closed shape, etc.

Further, the human facial image may include a single human face, or may include a plurality of human faces. When the human facial image includes a plurality of human faces, the adjusting parameters may also include human face adjusting parameters. The human face adjusting parameters may be used to add human face(s) onto the human facial image, or to remove human face(s) from the human facial image, or to move the position of each human face(s) on the human facial image. Thus, the human face adjusting parameters may be used to achieve interaction among a plurality of human faces to enhance the interactive effect of human faces of dynamic images.

The combining unit 63 is configured to combine the n number frames of synthesized images into a dynamic image based on a time order. Further, the combining unit 63 may be configured to quantify true colors of each synthesized image of the n number frames of synthesized images into preset specified 256 colors. A time delay is set for each synthesized image based on configuration parameters of the time delay contained in the file. The n number frames of synthesized images are combined into the dynamic image based on the time delay of each synthesized image.

It should be noted that the 256 colors may refer to 256 colors defined by Graphics Interchange Format (GIF) file. The 256 colors are well known colors in the field of image process. Further, the file may include pre-configured time delay parameters for each synthesized image. For example, the time delay of the synthesized image of the first frame may be 0-500 millisecond (ms) during the playback of the dynamic image. The time delay of the synthesized image of the second frame may be 500-800 ms during the playback of the dynamic image. The time delay of the synthesized image of the third frame may be 800-1200 ms during the playback of the dynamic image. Thus, the combining unit 63 may combine each synthesized image into a dynamic image. In addition, the combining unit 63 may quantify true colors of each synthesized image of the n number frames of synthesized images into preset specified 256 colors. The time delay of each synthesized image may be set based on configuration parameters contained in the file, and be written into specified file based on each synthesized image. The dynamic image generated by the file may be displayed.

Further, the dynamic image may be dynamic expression shared among communication accounts. The file may be one of the different files contained in a pre-configured source expression package. Thus, in one embodiment, the method may be performed repeatedly, of course, the file used at each time may be a different file in the source expression package, such that a plurality of dynamic expression may be generated.

The dynamic image or dynamic face expression may be combined using an octree algorithm. An octree is a tree data structure in which each internal node has exactly eight children, and the depth of the octree indicates the layers of the nodes starting from the top to the bottom. More specifically, after obtaining inputted a true color image, the true color image is traversed.

For each pixel p (R, G, B), it is inserted into one of the deepest leaf nodes of an octree. The node index of each level is calculated as: idx=((1 & (R<<level))<<2)+((1& (G<<level))<<1)+((1 & (B<<level))<<0). At the same time, the frequency information of the corresponding color is recorded in the leaf nodes. The octree may have up to 8 levels/layers, and each layer has eight nodes. Thus, a full octree can have a total of 8^8 or 2^24 leaf nodes, which happens to be the total number of colors of true color.

In order to accelerate the palette search speed, while inserting the nodes to create the octree, the offset position information of the pixel p is also written into a linked list of the leaf nodes, and the linked list pdlist is dynamically maintained.

Further, merging the full-color octree, and making the number of leaf nodes as the target quantization color number. A rule for the merging may include: the one with the same depth but of the minimum frequency is first reduced.

Afterwards, the merged octree is traversed to generate 256-color quantization palette and, at the same time, the color palette index for quantifying each pixel can also be obtained.

Because the offset information of each pixel is written in the pdlist of the corresponding octree color node, and the pdlist is dynamically updated when merging the leaf nodes, when obtaining a palette color, the quantization index of the corresponding pixel can be obtained at the same time. Thus, the scheme of space for time can be maximized to speed up the palette lookup.

It should be noted that, in the present disclosure each embodiment is progressively described, i.e., each embodiment is described and focused on difference between embodiments. Similar and/or the same portions between various embodiments may be referred to with each other. In addition, exemplary apparatus (e.g., a server and/or a terminal) is described with respect to corresponding methods.

The disclosed methods and/or apparatuses may be implemented in a suitable computing environment. The disclosure may be described with reference to symbol(s) and step(s) performed by one or more computers, unless otherwise specified. Therefore, steps and/or implementations described herein may be described for one or more times and executed by computer(s). As used herein, the term "executed by computer(s)" includes an execution of a computer processing unit on electronic signals of data in a structured type. Such execution may convert data or maintain the data in a position in a memory system (or storage device) of the computer, which may be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

A person of ordinary skill in the art may understand that the modules included herein are described according to their functional logic, but are not limited to the above descriptions as long as the modules may implement corresponding functions. Further, the specific name of each functional module is used for distinguishing from on another without limiting the protection scope of the present disclosure.

As used herein, the term "module" may be software objects executed on a computing system. A variety of components described herein including elements, modules, units, engines, and services may be executed in the computing system. The apparatus and/or methods may be implemented in a software manner. Of course, the apparatus and/or methods may be implemented using hardware. All of which are within the scope of the present disclosure.

In various embodiments, the disclosed modules may be configured in one apparatus (e.g., a processing unit) or configured in multiple apparatus as desired. The modules disclosed herein may be integrated in one module or in multiple modules. Each of the modules disclosed herein may be divided into one or more sub-modules, which may be recombined in any manner.

One of ordinary skill in the art would appreciate that suitable software and/or hardware (e.g., a universal hardware platform) may be included and used in the disclosed methods and apparatuses. For example, the disclosed embodiments may be implemented by hardware only, which alternatively may be implemented by software products only. The software products may be stored in a computer-readable storage medium including, e.g., ROM/RAM, magnetic disk, optical disk, etc. The software products may include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments may be obvious to those skilled in the art and may be included in this disclosure.

Imaging processing methods and apparatuses are provided. In the imaging processing methods and/or apparatuses, a human facial image is obtained. Each pre-configured source image in a file is synthesized with a synthesized human facial image corresponding to the source image. A total of n number frames of synthesized images are obtained. The file includes the n number of source images. The synthesized human facial image corresponding to the source image is the human facial image performed with an image adjusting treatment on the human facial image based on adjusting parameters. The adjusting parameters are adjusting parameters corresponding to the configuration of the source image in the file. The number n is an integer greater than 2. The n number frames of synthesized images are combined into a dynamic image based on a time order. Thus, the human facial image may be synthesized into a dynamic image composed with a plurality of synthesized images, so as to achieve the display of a plurality of expressions of a human face(s). In addition, the human face adjusting parameters may be used to achieve interaction among a plurality of human faces to enhance the interactive effect of human faces of dynamic images.

What is claimed is:

1. An image processing method, comprising:
   obtaining a human facial image;
   providing a total of n number of source images in a preconfigured file, wherein n is an integer greater than 2, and each source image corresponds to adjusting parameters for the source image in the preconfigured file;
   generating a synthesized human facial image for the each source image by adjusting the human facial image based on the adjusting parameters corresponding to the source image in the preconfigured file;
   individually synthesizing the each source image and the synthesized human facial image for the each source image to obtain n number frames of synthesized images; and
   combining the n number frames of synthesized images into a dynamic image in a time order.

2. The method according to claim 1, wherein the obtaining of the human facial image further comprises:
   obtaining a target image including the human facial image, aligning the target image with a preset mask, and extracting the human facial image from the target image based on the mask; or
   capturing an image of a human face through a camera device with an interface displaying the mask to create the human facial image located within a human facial area of the mask, and extracting the human facial image from the captured image.

3. The method according to claim 2, wherein the combining of the n number frames of synthesized images into the dynamic image based on the time order comprises:
   quantifying true colors of each synthesized image of the n number frames of synthesized images into previously-specified 256 colors, setting a time delay for each synthesized image based on configuration parameters of the time delay contained in the preconfigured file, and combining the n number frames of synthesized images into the dynamic image based on the time delay of each synthesized image.

4. The method according to claim 1, wherein the synthesizing the each source image and the synthesized human facial image for the each source image to obtain n number frames of synthesized images further comprises:
   zooming a t-th frame source image of the preconfigured file and the human facial image to a predetermined size, wherein t is a variable and the initial value of t is 1;
   reading out the adjusting parameters of the t-th frame source image in the preconfigured file;
   adjusting the human facial image based on the adjusting parameters of the t-th frame to obtain a t-th frame synthesized human facial image;
   synthesizing the source image of the t-th frame and the t-th frame synthesized human facial image by an alpha merge to obtain a synthesized t-th frame image; and
   incrementing a value of t by 1 and repeating from zooming the t-th frame source image of the preconfigured file and the human facial image to the predetermined size, until the value of t equals to the number n.

5. The method according to claim 4, wherein:
   the adjusting parameters comprise at least one of positional coordinates of the human facial image in the source image, a zooming ratio of the human facial image, a rotating angle and facial deformation parameters of the human facial image; and
   wherein the adjusting of the human facial image based on the adjusting parameters further comprises:
   adjusting the human facial image based on the adjusting parameters of the t-th frame to obtain a t-th frame synthesized human facial image by at least one of shifting position of the human facial image abased on the positional coordinates, zooming the human facial image based on the zooming ratio, rotating the human facial image based on the rotating angle, and changing facial features of the human facial image based on the deformation parameters.

6. The method according to claim 1, wherein the combining of the n number frames of synthesized images into the dynamic image based on the time order comprises:
   quantifying true colors of each synthesized image of the n number frames of synthesized images into previously-specified 256 colors, setting a time delay for each synthesized image based on configuration parameters of the time delay contained in the preconfigured file, and combining the n number frames of synthesized images into the dynamic image based on the time delay of each synthesized image.

7. The method according to claim 1, wherein the source image comprises at least:
   a foreground image and a background image.

8. An image processing apparatus, comprising:
   an obtaining unit configured to obtain a human facial image;
   a synthesizing unit configured to:
   provide a total of n number of source images in a preconfigured file, wherein n is an integer greater than 2, and each source image corresponds to adjusting parameters for the source image in the preconfigured file;
   generate a synthesized human facial image for the each source image by adjusting the human facial image based on the adjusting parameters corresponding to the source image in the preconfigured file; and
   individually synthesize the each source image and the synthesized human facial image for the each source image to obtain n number frames of synthesized images; and a combining unit configured to combine the n number frames of synthesized images into a dynamic image in a time order.

9. The apparatus according to claim 8, wherein the obtaining unit is further configured to:
obtain a target image including the human facial image, aligning the target image with a preset mask, and extracting the human facial image from the target image based on the mask; or
capture an image of a human face through a camera device with an interface displaying the mask to create the human facial image located within a human facial area of the mask, and extracting the human facial image from the captured image.

10. The apparatus according to claim 9, wherein the synthesizing unit is further configured to:
zoom a t-th frame source image of the preconfigured file and the human facial image to a predetermined size, wherein t is a variable and the initial value of t is 1;
read out the adjusting parameters of the t-th frame source image in the preconfigured file are;
adjust the human facial image based on the adjusting parameters of the t-th frame to obtain a t-th frame synthesized human facial image;
synthesize the source image of the t-th frame and the t-th frame synthesized human facial image by an alpha merge to obtain a synthesized t-th frame image; and
increment a value of t by 1 and to repeat from zooming the t-th frame source image of the preconfigured file and the human facial image to the predetermined size, until the value of t equals to the number n.

11. The apparatus according to claim 9, wherein:
the combining unit is further configured to quantify true colors of each synthesized image of the n number frames of synthesized images into previously-specified 256 colors, to set a time delay for each synthesized image based on configuration parameters of the time delay contained in the file, and to combine the n number frames of synthesized images into the dynamic image based on the time delay of each synthesized image.

12. The apparatus according to claim 8, wherein the synthesizing unit is further configured to:
zoom a t-th frame source image of the preconfigured file and the human facial image to a predetermined size, wherein t is a variable and the initial value of t is 1;
read out the adjusting parameters of the t-th frame source image in the preconfigured file are;
adjust the human facial image based on the adjusting parameters of the t-th frame to obtain a t-th frame synthesized human facial image;
synthesize the source image of the t-th frame and the t-th frame synthesized human facial image by an alpha merge to obtain a synthesized t-th frame image; and
increment a value of t by 1 and to repeat from zooming the t-th frame source image of the preconfigured file and the human facial image to the predetermined size, until the value of t equals to the number n.

13. The apparatus according to claim 12, wherein:
the adjusting parameters comprise at least one of positional coordinates of the human facial image in the source image, a zooming ratio of the human facial image, a rotating angle and facial deformation parameters of the human facial image; and
the synthesizing unit is further configured to adjust the human facial image based on the adjusting parameters of the t-th frame to obtain a t-th frame synthesized human facial image by at least one of shifting position of the human facial image abased on the positional coordinates, to zoom the human facial image based on the zooming ratio, to rotate the human facial image based on the rotating angle, and to change facial features of the human facial image based on the deformation parameters.

14. The apparatus according to claim 8, wherein:
the combining unit is further configured to quantify true colors of each synthesized image of the n number frames of synthesized images into previously-specified 256 colors, to set a time delay for each synthesized image based on configuration parameters of the time delay contained in the file, and to combine the n number frames of synthesized images into the dynamic image based on the time delay of each synthesized image.

15. The apparatus according to claim 8, wherein the source image comprises at least:
a foreground image and a background image.

* * * * *